United States Patent
Reesink et al.

(10) Patent No.: US 7,285,695 B1
(45) Date of Patent: *Oct. 23, 2007

(54) HYDROGENATION OF HYDROCARBON RESINS

(75) Inventors: Bernard Hendrik Reesink, Doorn (NL); Willem Dijkstra, Jorwerd (NL)

(73) Assignee: Engelhard Corporation, Iselin, NJ (US)

( * ) Notice: Subject to any disclaimer, the term of this patent is extended or adjusted under 35 U.S.C. 154(b) by 428 days.

This patent is subject to a terminal disclaimer.

(21) Appl. No.: 10/129,156

(22) PCT Filed: Nov. 1, 2000

(86) PCT No.: PCT/NL00/00785

§ 371 (c)(1), (2), (4) Date: Aug. 6, 2002

(87) PCT Pub. No.: WO01/32719

PCT Pub. Date: May 10, 2001

(30) Foreign Application Priority Data

Nov. 2, 1999 (EP) .................................. 99203611

(51) Int. Cl.
*C07C 5/02* (2006.01)
*C10C 45/00* (2006.01)

(52) U.S. Cl. ...................... 585/275; 585/276; 208/143; 208/144

(58) Field of Classification Search ................ 585/275, 585/276; 208/143, 144
See application file for complete search history.

(56) References Cited

U.S. PATENT DOCUMENTS 4,783,574 A * 11/1988 Barnes ........................ 585/738
5,482,616 A * 1/1996 Brahma et al. ............. 208/143
5,820,749 A * 10/1998 Haluska et al. ......... 208/216 PP
6,855,245 B1* 2/2005 Reesink et al. ............. 208/144

FOREIGN PATENT DOCUMENTS

| DE | 268 629 A | 6/1989 |
| EP | 0 022 358 A | 1/1981 |
| EP | 0 398 446 A | 11/1990 |
| EP | 0 938 924 A | 9/1999 |
| WO | WO 00/05326 | * 2/2000 |

* cited by examiner

*Primary Examiner*—Glenn Caldarola
*Assistant Examiner*—In Suk Bullock
(74) *Attorney, Agent, or Firm*—Raymond Keller; Melanie Brown; Brian Stegman

(57) ABSTRACT

The invention is directed to a process for the hydrogenation of hydrocarbon resins in the presence of a precious metal catalyst, wherein the hydrogenation is performed in the additional presence of at least one metal oxide, capable of reacting with sulfide and/or halogen.

15 Claims, 1 Drawing Sheet

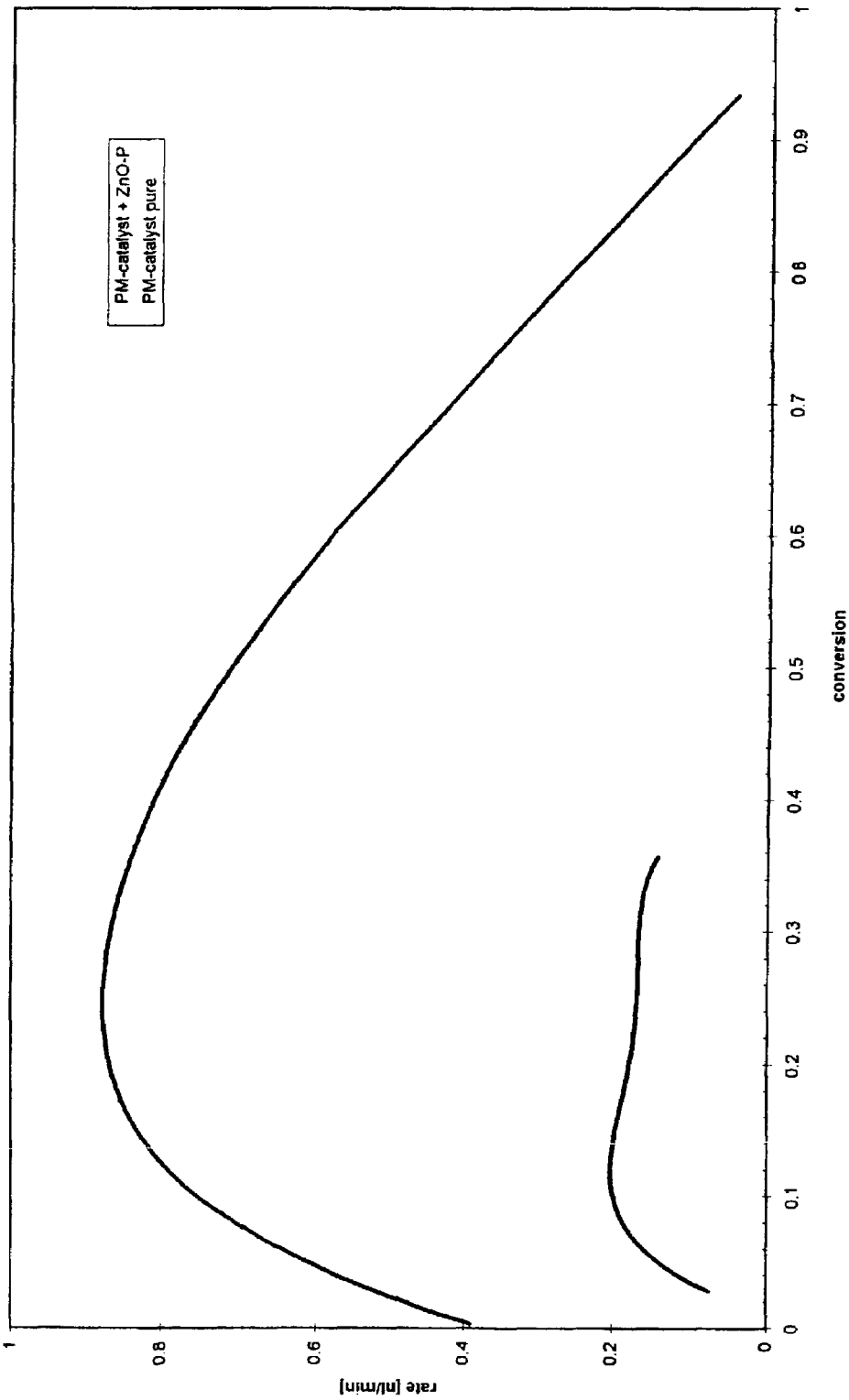

HYDROGENATION OF HYDROCARBON RESINS

The invention relates to a process for hydrogenating hydrocarbon resins containing sulfur impurities. Hydrocarbon resins are produced by polymerisation of hydrocarbon fractions, typically originating from the (catalytic) cracking of crude, including petroleum distillates and fractions from naphtha crackers, and tend to contain large amounts of impurities, such as sulfur compounds, nitrogen compounds, chlorine compounds and/or fluorine compounds. In order to give the resins the required properties they are usually hydrogenated using conventional hydrogenation catalysts, such as nickel or precious metal catalysts.

In hydrogenation often a problem presents itself in that sulfur and/or sulfur components in the feedstock affect the lifetime of nickel catalysts negatively and affects the activity of precious metal catalysts negatively. To avoid this problem much attention has been paid to the development of sulfur-resistant catalyst systems for the hydrogenation and/or dehydrogenation.

In general sulfur impurities are present in feedstocks as mercaptans or thiophenic compounds, which can be converted to $H_2S$ using a sulfided hydrogenation catalyst, such as a Co—Mo, a Ni—Mo or a Ni—W catalyst. This method is also known as hydrodesulfurization (HDS). The $H_2S$ formed may then be removed by reaction with zinc oxide, or, after separation and concentration in an organic stripper, be processed to elemental sulfur in a conventional Claus process.

In EP-A 398,446 it has been proposed to use a hydrogenation or dehydrogenation catalyst based on at least one hydrogenation component and a metal oxide component, whereby the two components are present on a support as separate particles, preferably in absence of any direct contact between the metal oxide particles and the hydrogenation component particles.

This catalyst provides a good basis for the hydrogenation of various sulfur containing feedstocks. However, there is a need for further improvement, especially in the area of resin hydrogenation in slurry phase, as the catalysts still deactivate rapidly, when hydrogenating hydrocarbon resins. In one embodiment of a hydrogenation process, wherein the sulfur containing resin was recirculated over a monolith catalyst, deactivation of the catalyst was considerable, thereby effectively making it impossible to carry out such a process.

The figure is a graph showing the results of practicing the method of the invention.

Accordingly it is a first object of the invention to provide a process for the hydrogenation of sulfur and/or halogen containing hydrocarbon resins, wherein the deactivation of the catalyst system is retarded considerably. It is a further object to provide such a process having a further improved tolerance for sulfur in the resin.

The invention provides a process for the hydrogenation of hydrocarbon resins, said process comprising hydrogenating the said resins in the presence of a precious metal catalyst, wherein the hydrogenation is performed in the additional presence of at least one metal oxide, capable of reacting with sulfide and/or halogen.

In the present invention the hydrogenation results in the breakdown of halogen and/or sulfur containing impurities. By the additional presence of the metal oxide component, either in admixture with the precious metal catalyst, or separately, the breakdown products are removed.

In a preferred embodiment, the present invention comprises at least two steps, namely a first step wherein the resin is hydrogenated in the presence of a precious metal catalyst and a second step in which the hydrogen sulfide (or halogenide) produced in the hydrogenated resin is absorbed on a metal oxide based absorbent. These steps may be carried out simultaneously, wherein the metal oxide component and the precious metal component are present together in the reaction mixture. It is also possible to carry out the adsorption after the precious metal and the reaction mixture have been separated from each other. Optionally the reaction mixture is recirculated, i.e. contacted again with the precious metal.

More in particular, as embodiments of the one step process, it is possible to have the metal oxide and the precious metal component slurried together in a reaction mixture, have both components present in the reactor in a fixed bed, or recirculate a reaction mixture having the metal oxide component slurried therein, over a bed of precious metal catalyst, for example a structured catalyst, such as a monolith, containing the precious metal catalyst, or recirculate the reaction mixture having the precious metal slurried therein, over a fixed bed of metal oxide.

It is also possible to carry out the process in a two step manner, wherein the resin is first hydrogenated over a precious metal component and subsequently treated with the metal oxide component. This can be done in two subsequent reactor beds, preferably in two subsequent reactors, wherein first the resin is hydrogenated over the precious metal catalyst and subsequently the hydrogen sulfide produced therein is absorbed in a second bed (reactor). In another embodiment it is also possible that the precious metal component and/or the metal oxide component are slurried in the reaction mixture in each step. This means that first a precious metal is slurried in the reaction mixture, the metal is subsequently separated after the hydrogenation, the metal oxide is slurried in the mixture and separated again after adsorption, optionally followed by recirculation, as above.

In this process it is also possible to recirculate part of the resin over the system, thereby increasing the removal of contaminants.

It has been found that the present approach to hydrogenating hydrocarbon resin that contain amounts of sulfur impurities, provides a further improvement of the known systems. More in particular it has been found that this process has a high resistance against catalyst deactivation.

In the present invention various hydrocarbon resin feedstocks may be used. A general definition of hydrocarbon resins has been given in ISO 472, namely products produced by polymerization from coal tar, petroleum and turpentine feedstocks. Preferred are petroleum distillates, resins, and the like. It is possible to use these feedstocks directly, but it is also possible to use the product from a previous hydrodesulfurisation process, i.e a feedstock having a reduced sulfur content, for example in the range of up to 500 ppm, preferably up to 300 ppm.

The feedstock is first hydrogenated over a conventional precious metal catalyst. Generally these are supported precious metal catalysts, containing from 0.0001 to 5 wt. %, more in particular 0.01 to 5 wt. % precious metal calculated on the weight of the catalyst. Preferred amounts are between 0.1 and 2 wt %. The precious metals that may be used are platinum, palladium, rhodium, ruthenium, and alloys thereof, such as platinum-palladium.

As support suitable supports for precious metal catalysts may be used, such as ceramic materials. Examples are silica, alumina, silica-alumina, titania, zirconia, zeolites, clay materials, combinations thereof and the like.

The metal of the metal oxide component will generally be selected from those metals that react with hydrogen sulfide to give stable metal sulfides. An enumeration of suitable metals has been given in the cited EP-A 398,446. Examples are silver, lanthanum, antimony, nickel, bismuth, cadmium, lead, tin, vanadium, calcium, strontium, barium, cobalt, copper, tungsten, zinc, molybdenum, manganese and iron. Preferred metals are zinc and iron.

As indicated above, there are various possibilities for carrying out the present invention. In a first embodiment the feedstock is first hydrogenated over a bed of precious metal catalyst. The hydrogenated feedstock is subsequently treated in an absorbing bed of metal oxide particles. This can either be a second bed in the same reactor as the bed of the precious metal catalyst or in a separate reactor. From the point of view of ease of recovery and regeneration of catalyst, the latter embodiment is preferred.

According to another embodiment it is possible to carry out the hydrogenation in the presence of the metal oxide particles. This can be done by mixing the metal oxide particles and the precious metal catalyst in one bed. However, for the reasons given above this is not preferred.

The present invention may suitably be carried out in a slurry reactor, wherein the precious metal catalyst is slurried in the resin to be hydrogenated, optionally together with the metal oxide component.

The hydrogenation conditions will depend on the type of resin to be hydrogenated. Generally lighter resins require less severe conditions. In general the temperature will be between 125 and 350° C., with hydrogen pressures of between 2 and 250 bar.

EXAMPLES

Two experiments were done on polymerised hydrocarbon resins, containing 25 ppm of sulfur, mainly in the form of thiophenic compounds, whereby in the first experiment a precious metal catalyst (0.5 wt. % of platinum on silica-alumina spheres) was slurried in the resin, in an amount of 23 g catalyst/kg, of resin. At a temperature of 250° C. hydrogen, at a pressure of 100 bar was bubbled through the resin. In the attached figure the reaction rate (consumption of hydrogen) is plotted against the degree of conversion.

In the second experiment additionally zinc oxide powder was slurried in the resin in an amount of 10 g/kg of resin. The figure also gives the plot of rate versus conversion of this experiment. It is clear from a comparison of the two plots, that the activity of the precious metal is strongly enhanced in the system of the invention.

The invention claimed is:

1. Process for the hydrogenation of a feedstock comprising hydrocarbon resins in the presence of a precious metal catalyst, wherein the precious metal in said catalyst is selected from the group consisting of platinum, palladium, rhodium, ruthenium and alloys thereof, and wherein the hydrogenation is performed in the additional presence of at least one metal oxide, capable of reacting with sulfide and/or halogen wherein the metal oxide is an oxide of zinc or iron.

2. Process according to claim 1, wherein the feedstock comprising hydrocarbon resins is first hydrogenated in the presence of a precious metal catalyst and wherein the hydrogenated feedstock is subsequently contacted with said at least one metal oxide, capable of reacting with sulfide and/or halogen.

3. Process according to claim 1, wherein at least part of the hydrocarbon resins, the metal oxide and/or the precious metal catalyst are recirculated.

4. Process according to claim 1, wherein the precious metal catalyst is a supported catalyst, the support preferably being selected from silica, alumina, silica-alumina, titania, zirconia, zeolites, clay materials and combinations thereof.

5. Process according to claim 1, wherein the precious metal content of the catalyst is between 0.0001 and 5 weight %, calculated on the weight of the catalyst.

6. Process according to claim 1, wherein the hydrogenation is carried out in a loop reactor, containing a fixed bed of the precious metal catalyst and a dispersed said metal oxide in the hydrocarbon resin, the dispersion being recirculated through the catalyst bed.

7. Process according to claim 6, wherein the fixed bed is a structured reactor element.

8. Process according to claim 2, wherein:
at least part of the hydrocarbon resins, the metal oxide and/or the precious metal catalyst are recirculated,
the precious metal catalyst is a supported catalyst, the support preferably being selected from silica, alumina, silica-alumina, titania, zirconia, zeolites, clay materials and combinations thereof, and
the precious metal content of the catalyst is between 0.0001 and 5 weight %, calculated on the weight of the catalyst.

9. Process according to claim 8, wherein the hydrogenation is carried out in a loop reactor, containing a fixed bed of the precious metal catalyst and a dispersed said metal oxide in the hydrocarbon resin, the dispersion being recirculated through the catalyst bed.

10. Process according to claim 1, wherein the hydrocarbon resins are yielded by polymerization from coal tar, petroleum or turpentine.

11. Process for the hydrogenation of a feedstock comprising hydrocarbon resins in the presence of a precious metal catalyst, wherein the hydrogenation is performed in the additional presence of at least one metal oxide, capable of reacting with sulfide and/or halogen, wherein the hydrogenation is carried out in a loop reactor, containing a fixed bed of the precious metal catalyst and a dispersed metal oxide in the hydrocarbon resin, the dispersion being recirculated through the catalyst bed.

12. Process for the hydrogenation of a feedstock comprising hydrocarbon resins, the hydrocarbon resins are yielded by polymerization from coal tar, petroleum or turpentine, wherein the hydrogenation is performed in the presence of a precious metal catalyst, and wherein the hydrogenation is performed in the additional presence of at least one metal oxide, capable of reacting with sulfide and/or halogen.

13. Process according to claim 1, wherein said alloy is platinum-palladium.

14. Process according to claim 11, wherein the fixed bed is a structured reactor element.

15. Process according to claim 7 or 8, wherein the structured reactor element is a monolith.

* * * * *